United States Patent
Hsiao et al.

(10) Patent No.: US 11,432,004 B2
(45) Date of Patent: Aug. 30, 2022

(54) METHOD AND APPARATUS OF CONSTRAINING MERGE FLAG SIGNALING IN VIDEO CODING

(71) Applicant: MEDIATEK INC., Hsinchu (TW)

(72) Inventors: Yu-Ling Hsiao, Hsinchu (TW); Chih-Wei Hsu, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 16/846,514

(22) Filed: Apr. 13, 2020

(65) Prior Publication Data
US 2020/0344492 A1    Oct. 29, 2020

Related U.S. Application Data (60) Provisional application No. 62/838,394, filed on Apr. 25, 2019.

(51) Int. Cl.
*H04N 19/583* (2014.01)

(52) U.S. Cl.
CPC ................. *H04N 19/583* (2014.11)

(58) Field of Classification Search
None
See application file for complete search history.

(56) References Cited

U.S. PATENT DOCUMENTS

| | | |
|---|---|---|
| 2014/0177720 A1* | 6/2014 | Zhang ............... H04N 19/597 375/240.16 |
| 2014/0286428 A1 | 9/2014 | Lee et al. |
| 2014/0301469 A1 | 10/2014 | Wang et al. |
| 2017/0013276 A1* | 1/2017 | Chen ............... H04N 19/176 |
| 2018/0098063 A1 | 4/2018 | Chen et al. |
| 2018/0199060 A1 | 7/2018 | Zheng |

OTHER PUBLICATIONS

Combined Taiwanese Office Action and Search Report dated Oct. 28, 2021 in Patent Application No. 109112748 (with English translation of Category of Cited Documents), citing documents AA-AD therein, 21 pages.

* cited by examiner

*Primary Examiner* — Mikhail Itskovich
(74) *Attorney, Agent, or Firm* — Oblon, McClelland, Maier & Neustadt, L.L.P.

(57) ABSTRACT

Method and apparatus for constrained mode signaling are disclosed. According to one method, a plurality of mode syntaxes are used to signal a current mode used for the current block. If one or more of the plurality of candidate modes are unavailable according to one or more conditions related to the current block, signaling a mode syntax is skipped at the video encoder side or parsing the mode syntax is skipped at the video decoder side. In one embodiment, a regular flag indicating on or off of a regular Merge mode or Skip mode is not signaled if Merge mode with MVD (MMVD) mode, Affine mode, subblock Temporal Motion Vector Prediction (SbTMVP) mode, Combined Inter and Intra Prediction (CIIP) Merge mode, and Triangle Prediction Mode (TPM) are disabled as indicated by an SPS flag.

10 Claims, 3 Drawing Sheets

METHOD AND APPARATUS OF CONSTRAINING MERGE FLAG SIGNALING IN VIDEO CODING

CROSS REFERENCE TO RELATED APPLICATIONS

The present invention claims priority to U.S. Patent Application, Ser. No. 62/838,394, filed on Apr. 25, 2019. The U.S. Patent Application is hereby incorporated by reference in its entirety.

FIELD OF THE INVENTION

The present invention relates to coding of video and image data. In particular, the present invention relates to methods and apparatus of constraining Merge flag signaling in order to reduce unnecessary signaling.

DESCRIPTION OF THE RELATED ART

Video data requires a lot of storage space to store or a wide bandwidth to transmit. Along with the growing high resolution and higher frame rates, the storage or transmission bandwidth requirements would be formidable if the video data is stored or transmitted in an uncompressed form. Therefore, video data is often stored or transmitted in a compressed format using video coding techniques. The coding efficiency has been substantially improved using newer video compression formats such as H.264/AVC and the emerging HEVC (High Efficiency Video Coding) standard.

In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Furthermore, the basic unit for transform coding is square size named Transform Unit (TU).

After the development of HEVC standard, another merging video coding standard, named as Versatile Video Coding (VVC), is being developed under Joint Video Exploration Team (JVET) of ITU-T SG 16 WP 3 and ISO/IEC JTC 1/SC 29/WG 11. Various new coding tools along with some existing coding tools have been evaluated for VVC. Some relevant video coding tools/modes are described as follows.

Merge Mode

To improve the coding efficiency of motion vector (MV) coding in HEVC, HEVC supports Skip and Merge mode. Skip and Merge modes obtain the motion information from spatially neighboring blocks (i.e., spatial candidates) or a temporal co-located blocks (i.e., temporal candidates). When a block is Skip or Merge mode, no motion information is coded, instead, only the index of the selected candidate is coded. For Skip mode, the residual signal is forced to be zero and not coded. In HEVC, if a particular block is encoded as Skip or Merge, a candidate index is signaled to indicate which candidate among the candidate set is used for merging. Each merged block reuses the MV, prediction direction, and reference picture index of the selected candidate.

For Merge mode in HM-4.0 (HEVC Test Model Version 4.0) in HEVC, up to four spatial MV candidates and one temporal MV candidate are derived. After the derivation process of the four spatial MV candidates and one temporal MV candidate, removing redundancy (i.e., pruning) is applied to remove redundant MV candidates. If after removing redundancy (i.e., pruning), the number of available MV candidates is smaller than five, three types of additional candidates can be derived and added to the candidate set (i.e., candidate list). The encoder selects one final candidate within the candidate set for Skip or Merge mode based on the rate-distortion optimization (RDO) decision, and transmits the index to the decoder.

Advanced Temporal Motion Vector Prediction (ATMVP)

In Joint Exploration Model (JEM) software with QTBT, each CU can have at most one set of motion for each prediction direction. The Advanced Temporal Motion Vector Prediction (ATMVP) mode is firstly proposed in VCEG-AZ10 (W.-J. Chien, et al., "*Extension of Advanced Temporal Motion Vector Predictor*", ITU-T SG16/Q6 Document: VCEG-AZ10, June 2015). In ATMVP, a large CU is split into sub-CUs and motion information is derived for all the sub-CUs of the large CU. The ATMVP mode uses a spatial neighbor to get an initial vector, and the initial vector is used to determine the coordinate of the collocated block on the collocated picture. The sub-CU (usually 4×4 or 8×8) motion information of the collocated block in the collocated picture is then retrieved and filled into sub-CU (usually 4×4 or 8×8) motion buffer of current Merge candidate. The initial vector of the ATMVP mode may be modified in some embodiments. Some variant embodiments of the ATMVP are proposed. For example, a simplified ATMVP mode is disclosed in JVET-K0346 (X. Xiu, et al., "*CE4-related: One simplified design of advanced temporal motion vector prediction (ATMVP)*", Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0346).

Figure 1:
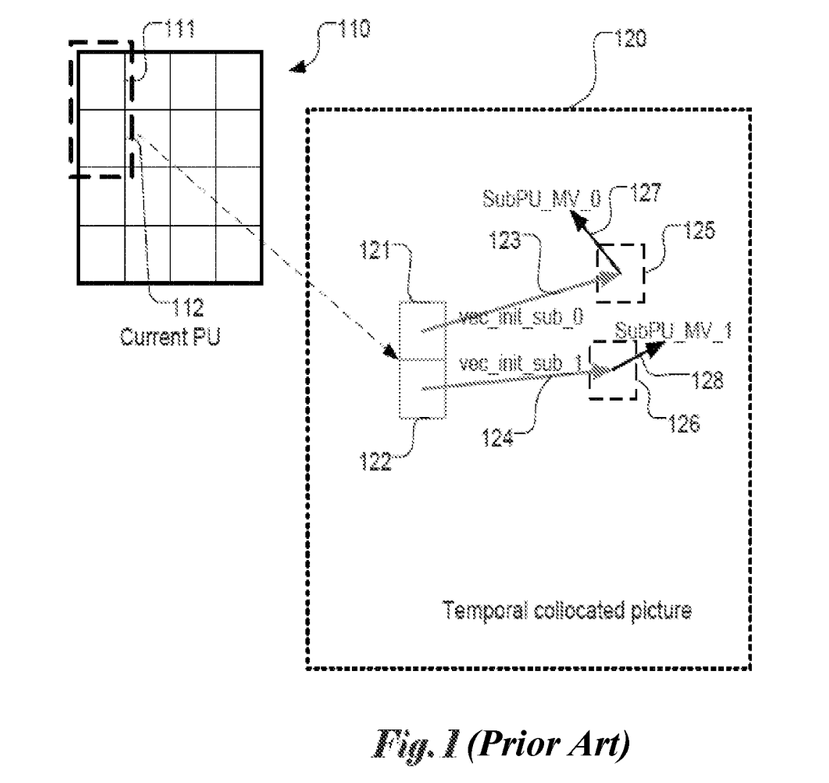
FIG. 1 illustrates an example of Advanced Temporal Motion Vector Prediction (ATMVP), where a CU is partitioned into sub-Pus and the ATMVP mode partitions the current PU into multiple Sub-PUs, and finds all corresponding temporal collocated motion vectors for each Sub-PU.

An example of ATMVP is shown in FIG. 1, where a CU is partitioned into sub-PUs. Unlike the traditional temporal candidate, the Sub-PU TMVP mode partitions the current PU into multiple Sub-PUs, and finds all corresponding temporal collocated motion vectors for each Sub-PU. The current PU of size M×N has (M/P)×(N/Q) sub-PUs, each sub-PU is of size P×Q, which M is divisible by P, and N is divisible by Q. The example in FIG. 1 corresponds to the case that a current PU 110 is divided into 16 sub-PUs (i.e., M/P=4 and N/Q=4). Sub-PU 0 (111) and sub-PU 1 (112) are indicated. The detailed algorithm for sub-PU TMVP is described as follows. The detail algorithm for Sub-PU TMVP is described as follows.

In step 1, for the current PU 110 coded in the sub-PU TMVP mode, an "initial motion vector", denoted as vec_init (123 and 124) is determined for the sub-PUs (121 and 122) of the collocated PU in a temporal collocated picture 120. For example, the vec_init can be the MV of the first available spatial neighboring block of the current PU 110. In FIG. 1, vec_init_0 123 points to sub-block 125 and vec_init_1 123 points to sub-block 126. Alternatively, the MV of other neighboring block may also be used as the initial motion vector. Conventionally, the vec_init is the first available candidate among spatial neighboring blocks. For example, if the first available spatial neighboring block has L0 and L1 MVs, and LX is the first list for searching collocated information, then the vec_init uses L0 MV when LX=L0, or L1 when LX=L1. The value of LX (L0 or L1) depends on which list (L0 or L1) is better for collocated information. If L0 is better for collocated information (e.g. POC (Picture Order Count) distance closer than L 1), then LX is equal to L0, and vice versa. LX assignment can be performed at a slice level, brick level, tile group level, or picture level. In FIG. 1, the motion vectors for sub-blocks 125 and 126 are labelled as 127 and 128 respectively.

A "collocated picture searching process" then starts. The "collocated picture searching process" is to find a main collocated picture for all sub-PUs in the Sub-PU TMVP mode. The main collocated picture is denoted as main_colpic. Conventionally, it first searches the reference picture selected by the first available spatial neighboring bloc. Then, in B-Slices, it searches all reference pictures of current picture starting from L0 (or L1), reference index 0, then index 1, then index 2, and so on (increasing index order). If it finishes searching L0 (or L1), then it searches another list. In P-slice, it first searches the reference picture selected by the first available spatial neighboring block. Then, it searches all reference pictures of current picture of the list starting from reference index 0, then index 1, then index 2, and so on (i.e., increasing index order).

If it finishes searching L0 (or L1), it then searches another list. In P-slice, it first searches the reference picture selected by the first available spatial neighboring block; and then, it searches all reference picture of current picture of the list starting from reference index 0, then index 1, then index 2, and so on (in increasing index order). During searching, for each searched picture, it has a process named "availability checking". The "availability checking" first adds the "around center position" of current PU with vec_init_scaled, where vec_init_scaled is the MV with appropriate MV scaling from the vec_init. Secondly, the added position is used to check for Intra/Inter of the searched picture.

Here the "around center position" can be determined in different ways. In one example, the position corresponds to the center pixel. For example, for a PU with size equal to M*N, the "around center position" can be determined according to position (M/2, N/2)). In another example, the "around center position" can be determined according to the center pixel of center sub-PU. In yet another example, "around center position" may be the mix of previous two examples depending on the current PU shape. The detailed implement of the "around center position" is not limited to these three examples.

Finally in the "availability checking", if the checking result is Inter, then the availability is true; if the checking result is Intra, then the availability is false. When the "availability checking" is finished, if the availability is true, then the current searched picture is recorded as the main collocated picture and searching process is finished. If the availability is false, then it starts to search next picture. During the "collocated picture searching process", an MV scaling is needed when the reference picture of the vec_init is not equal to the current reference picture. The MV scaling process will use a scaled version of the motion vector. The MV is scaled depending on the temporal distances between the current picture and the reference pictures of the vec_init and the searched reference picture, respectively. After MV scaling, the MV is denoted as vec_init_scaled.

Then, in step 2, for each sub-PU, it further finds an "initial motion vector for Sub-U", denoted as vec_init_sub_i and i=0~((M/P)×(N/Q)−1). Conventionally, vec_init_sub_i is equal to vec_init_scaled.

In step 3, for each sub-PU, it finds a collocated picture for reference list 0 and a collocated picture for reference list 1. Conventionally, there is only one collocated picture, as indicated by main_colpic, for reference list 0, 1 for all sub-PUs of the current PU.

Then, in step 4, it further finds collocated location in collocated picture for each Sub-PU. We assume that the current Sub-PU is Sub-PU i, the collocated location is calculated as shown in follows:

collocated location x=Sub-PU_i_x+vec_init_sub_i_x (integer part)+shift_x, collocated location y=Sub-PU_i_y+vec_init_sub_i_y (integer part)+shift_y.

In the above equations, Sub-PU_i_x means horizontal left-top location of sub-PU i inside the current picture (integer location); Sub-PU_i_y means vertical left-top location of sub-PU i inside the current picture (e.g., integer location); and vec_init_sub_i_x means horizontal part of vec_init_sub_i, which has integer part and fractional part in the calculation, however, only the integer part is used. Vec_init_sub_i_y means vertical part of vec_init_sub_i, which has integer part and fractional part in the calculation, however only the integer part is used. Shift_x means a shift value and shift_x can be half of sub-PU width. However, other values may be used for shift_x. shifty means a shift value and shifty can be half of sub-PU height. However, other values may be used for shifty.

Finally, in step 5, it finds the motion information temporal predictor for each Sub-PU, denoted as SubPU_MI_i, of each Sub-PU. The SubPU_MI_i is the motion information from collocated_picture_i_L0 and collocated_picture_i_L1 on collocated location x, and collocated location y. The motion information (MI) is defined as the set of MV_x, MV_y, reference lists, reference index, and other merge-mode-sensitive information, such as local illumination compensation flag. Furthermore, in one embodiment, MV_x and MV_y may be scaled according to the temporal distance relation between collocated picture, current picture, and reference picture of the collocated MV.

Affine Mode and Affine Merge Mode

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \overset{\Delta}{\Rightarrow} \begin{cases} vx = (1-a)x - by - e \\ vy = (1-a)y + bx - f \end{cases} \quad (1)$$

Figure 2A:
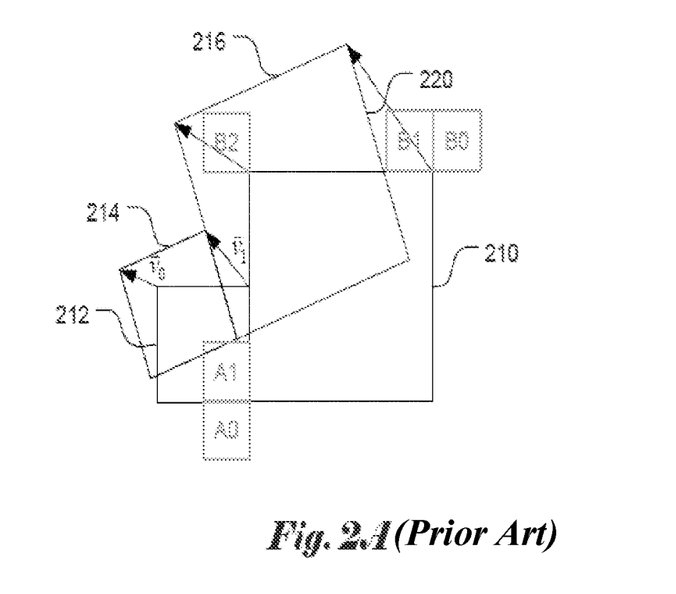
FIG. 2A illustrates an example of four-parameter Affine model, where the reference block for a current block corresponds to a rotated and scaled version of the current block according to the four-parameter Affine model.

An example of the four-parameter affine model is shown in FIG. 2A, where block 210 corresponds to the current block and block 220 corresponds to the reference block derived according to a four-parameter affine model. The transformed block is a rectangular block. The motion vector field of each point in this moving block can be described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (2)$$

In the above equations, $(v_{0x}, v_{0y})$ is the control-point motion vector (i.e., $v_0$) at the upper-left corner of the block, and $(v_{1x}, v_{1y})$ is another control-point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used.

There are two kinds of affine candidate: Inherited affine candidate and Corner derived candidate (i.e., constructed candidate). For the inherited affine candidate, the current block inherits the affine model of a neighboring block. All control-point MVs are from the same neighboring block. If the current block 210 inherits the affine motion from block A1, the control-point MVs of block A1 are used as the control-point MVs of the current block as shown in FIG. 2A, where the block 212 associated with block A1 is rotated to block 214 based on the two control-point MVs ($v_0$ and $v_1$). Accordingly, the current block 210 is rotated to block 216. The inherited candidates are inserted before the corner derived candidates. The order to select a candidate for inheriting the control-point MVs is according to: (A0→A1) (B0→B1→B2).

Figure 2B:
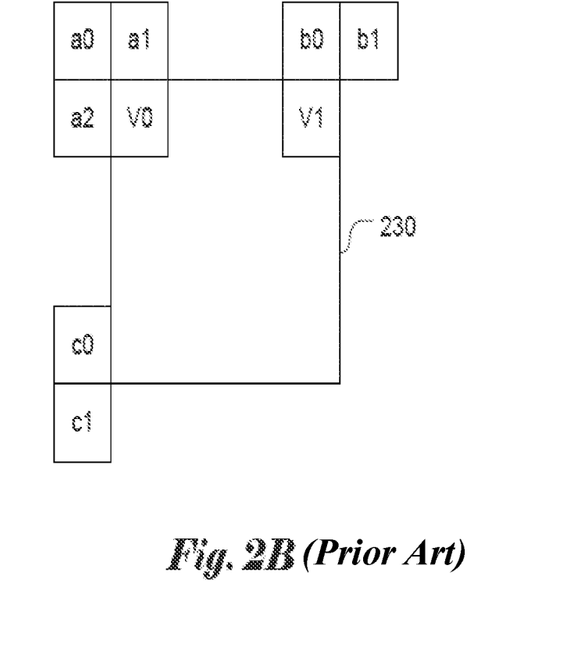
FIG. 2B illustrates an example of a neighboring block set that is used for deriving the corner-derived affine candidate, a control-point motion vector of a corner block is selected from the motion vectors of the neighboring blocks.

In contribution ITU-TI3-SG16-C1016, for an Inter mode coded CU, an affine flag is signaled to indicate whether the affine Inter mode is applied or not when the CU size is equal to or larger than 16×16. If the current block (e.g., current CU) is coded in affine Inter mode, a candidate MVP pair list is built using the neighbor valid reconstructed blocks. FIG. 2B illustrates the neighboring block set used for deriving the corner-derived affine candidate. As shown in FIG. 2B, $\vec{v}_0$ corresponds to a motion vector of the block V0 at the upper-left corner of the current block 230, which is selected from the motion vectors of the neighboring block a0 (referred as the above-left block), a1 (referred as the inner above-left block) and a2 (referred as the lower above-left block). The $\vec{v}_1$ corresponds to motion vector of the block V1 at the upper-right corner of the current block 220, which is selected from the motion vectors of the neighboring block b0 (referred as the above block) and b1 (referred as the above-right block).

In the above equation, MVa is the motion vector associated with the blocks a0, a1 or a2, MVb is selected from the motion vectors of the blocks b0 and b1 and MVc is selected from the motion vectors of the blocks c0 and c1. The MVa and MVb that have the smallest DV are selected to form the MVP pair. Accordingly, while only two MV sets (i.e., MVa and MVb) are to be searched for the smallest DV, the third DV set (i.e., MVc) is also involved in the selection process. The third DV set corresponds to motion vector of the block at the lower-left corner of the current block 210, which is selected from the motion vectors of the neighboring block c0 (referred as the left block) and c1 (referred as the left-bottom block). In the example of FIG. 2B, the neighboring blocks (a0, a1, a2, b0, b1, c0 and c1) used to construct the control-point MVs for affine motion model are referred as a neighboring block set in this disclosure.

In ITU-TI3-SG16-C-1016, an affine Merge mode is also proposed. If current is a Merge PU, the neighboring five blocks (c0, b0, b, c1, and a0 blocks in FIG. 2B) are checked to determine whether one of them is affine Inter mode or affine Merge mode. If yes, an affine_flag is signaled to indicate whether the current PU is affine mode. When the current PU is coded in affine Merge mode, it gets the first block coded with affine mode from the valid neighbor reconstructed blocks. The selection order for the candidate block is from left, above, above-right, left-bottom to above-left (i.e., c0→b0→b→c1→a0) as shown in FIG. 2B. The affine parameter of the first affine coded block is used to derive the $v_0$ and $v_1$ for the current PU.

Triangular Prediction Unit Mode Technique

Figure 3:
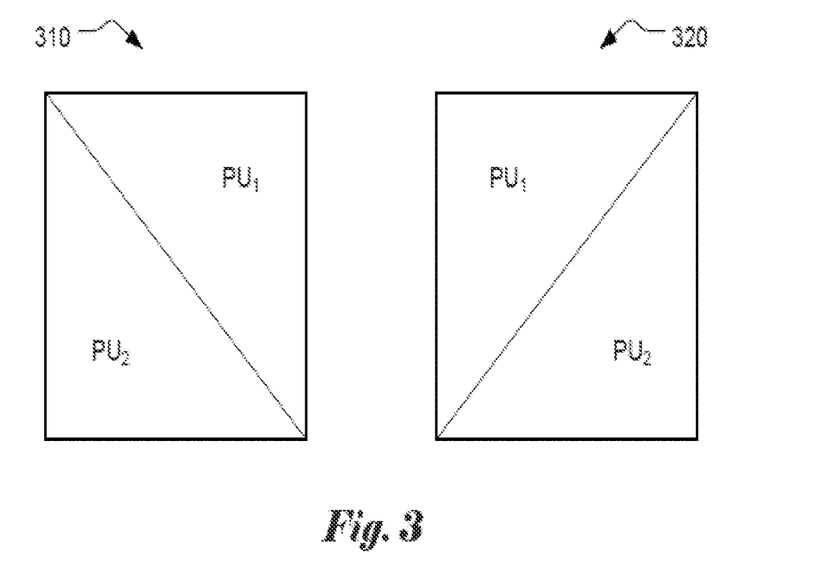
FIG. 3 illustrates an example of the triangular prediction unit mode, where the mode splits a CU into two triangular prediction units, in either diagonal or inverse diagonal direction.

The concept of the triangular prediction unit mode is to introduce a triangular partition for motion compensated prediction. As shown in FIG. 3, it splits a CU into two triangular prediction units, in either diagonal 310 or inverse diagonal direction 320. Each triangular prediction unit in the CU is Inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to Skip and Merge modes.

Merge with Motion Vector Difference (MMVD)

MMVD (Merge with MVD) Merge candidate is a technique developed under an emerging video coding standard called VVC (Versatile Video Coding). MMVD Merge candidate is also called UMVE (Ultimate Motion Vector Expression) Merge candidate. In JVET-K0115 (S. Jeong, et al., "*CE4 Ultimate motion vector expression in J0024 (Test 4.2.9)*", in Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0115), ultimate motion vector expression (UMVE) proposed in JVET-J0024 (S. Akula, et. Al., "*Description of SDR, HDR and 360° video coding technology proposal considering mobile application scenario by Samsung, Huawei, GoPro, and HiSilicon*", in Joint Video Exploration Team (JVET) of ITU-T SG 16 WP 3 and ISO/IEC JTC 1/SC 29/WG 11, 10th Meeting: San Diego, US, 10-20 Apr. 2018, Document: JVET-J0024) is presented. A reference frame in reference list L1 and a reference frame in reference list L1 correspond to the two reference for bi-prediction. A line through the center of the current block goes through two corresponding pixels in the two reference frames. The search is performed around the center points associated with the line. In order to simplify the search process, only specific locations around the center point vertically and horizontally will be searched for L0 reference and L1 reference. UMVE is used for either Skip or Merge modes with a proposed motion vector expression method. UMVE re-uses the same Merge candidate as VVC. Among the Merge candidates, a candidate can be selected, and is further expanded by the proposed motion vector expression method. UMVE provides a new motion vector expression with simplified signaling. The expression method includes prediction direction information, starting point, motion magnitude, and motion direction.

Combined Inter/Intra Prediction (CIIP)

In VTM (VVC Test Model), a coding tool, named combined Inter/Intra prediction (CIIP) mode is introduced. In order to form the CIIP prediction, an Intra predictor determined and an Inter predictor are determined. Then, the combined Inter and Intra prediction signals are derived from weighted averaging of the Inter and Intra prediction signals. A more detailed explanation of the algorithm can be found in JVET-L0100 (M.-S. Chiang, et al., "CE10.1.1: Multi-hypothesis prediction for improving AMVP mode, skip or merge mode, and Intra mode," ITU-T SG 16 WP 3 and ISO/IEC JTC 1/SC 29/WG 11, 12th Meeting: Macao, Conn., October 2018, Document: JVET-L0100).

Regular Merge/Skip Mode

In VTM-4.0 (VVC Test Model version 4.0), the Merge and Skip modes are further classified into five and four categories respectively, including the regular Merge/Skip, Merge mode with MVD (MMVD), subblock mode, combined Inter and Intra prediction (CIIP) Merge and triangle prediction mode (TPM). Here CIIP is only available under Merge mode while the other four modes are available for both Merge and Skip mode.

A regular flag is introduced immediately after the Merge flag and Skip flag to indicate whether the regular Merge/Skip mode is used by the current CU. The signaling for Merge mode is illustrated in the Table 1 and Table 2 for Merge and Skip modes, respectively.

TABLE 1

The flag signaling for Merge modes

| Signaled Modes | Regular Flag | MMVD Flag | Subblock Flag | CIIP Flag |
| --- | --- | --- | --- | --- |
| Regular | 1 | — | — | — |
| MMVD | 0 | 1 | — | — |
| Subblock | 0 | 0 | 1 | — |
| CIIP | 0 | 0 | 0 | 1 |
| TPM | 0 | 0 | 0 | 0 |

TABLE 2

The flag signaling for Skip modes

| Signaled Modes | Regular Flag | MMVD Flag | Subblock Flag |
| --- | --- | --- | --- |
| Regular | 1 | — | — |
| MMVD | 0 | 1 | — |
| Subblock | 0 | 0 | 1 |
| TPM | 0 | 0 | 0 |

In the existing system, the flags for signaling a mode for a current block do not take into account redundancy due to constraints imposed on the current block. Accordingly, it is desired for the present invention to develop methods and apparatus to avoid or reduce such redundancy.

BRIEF SUMMARY OF THE INVENTION

A method and apparatus for video encoding or video decoding are disclosed. According to this method, input data related to a current block in a current picture at a video encoder side are received or a video bitstream corresponding to compressed data including the current block in the current picture at a video decoder side is received, wherein a plurality of mode syntaxes are signaled at the video encoder side or parsed at the video decoder side to indicate a current mode used for the current block and the current mode belongs to a mode set consisting of a plurality of candidate modes. If one or more of the plurality of candidate modes are unavailable according to one or more conditions related to the current block, then signaling at least one mode syntax is skipped at the video encoder side or parsing at least one mode syntax is skipped at the video decoder side. The current block is encoded or decoded according to the current mode.

In one embodiment, when said at least one mode syntax is not signaled at the video encoder side or not parsed at the video decoder side, a corresponding mode associated with said at least one mode syntax is inferred to be enabled or disabled.

In one embodiment, said one or more conditions correspond to one or more SPS (Sequence Parameter Set) flags, one or more size constraints, a slice type, or a Skip flag.

In one embodiment, the plurality of candidate modes comprises a combination of regular Merge mode, Merge mode with MVD (MMVD) mode, subblock mode, Combined Inter and Intra Prediction (CIIP) Merge, and Triangle Prediction Mode (TPM). For example, a regular flag indicating on or off of the regular Merge mode of a non-Skip block is not signaled if size of the current block is smaller than 64 or equal to 32 so that the subblock mode, the CIIP Merge mode and the TPM are not valid and if the MMVD mode is disabled as indicated by an SPS flag. In another example, a regular flag indicating on or off of the regular Merge mode of a non-Skip block is not signaled if size of the current block is larger than or equal to 64 and if the MMVD mode, the subblock mode, the CIIP Merge mode, the TPM are disabled as indicated by an SPS flag.

In one embodiment, the plurality of candidate modes comprises a combination of regular Skip mode, Merge mode with MVD (MMVD), subblock mode, Combined Inter and Intra Prediction (CIIP) Merge mode, and Triangle Prediction Mode (TPM). For example, a regular flag indicating on or off of the regular Merge mode of a Skip block is not signaled if size of the current block is smaller than 64 or equal to 32 so that the subblock mode, CIIP Merge mode and TPM are not valid and if MMVD mode is disabled as indicated by an SPS flag. In another example, a regular flag indicating on or off of the regular Merge mode of a Skip block is not signaled if size of the current block is larger than or equal to 64 and if the MMVD mode, the subblock mode, the TPM are disabled as indicated by an SPS flag.

In one embodiment, a regular flag indicating on or off of a regular Merge mode or Skip mode is not signaled if Merge mode with MVD (MMVD) mode, Affine mode, subblock Temporal Motion Vector Prediction (SbTMVP) mode, Combined Inter and Intra Prediction (CIIP) Merge mode, and Triangle Prediction Mode (TPM) are disabled as indicated by an SPS flag.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It is observed that a regular flag needs to be signaled only when multiple possible Merge or Skip modes are valid. Otherwise, if only one regular Merge/Skip is valid, the regular flag should not be signaled so as to avoid redundant signaling and the regular Merge/Skip mode should be inferred to be true to avoid undefined modes.

In order to avoid redundant signaling, multiple constraints are proposed for the regular flag signaling as follows.

In one embodiment, if the CU size is smaller than a threshold (or equal to a threshold), some modes are not valid. Also, some other modes may be disabled as indicated by the SPS flag. In this case, the regular flag should not be signaled and the regular Merge/Skip mode should be inferred to be true. For example, for the Skip mode, if the CU size is smaller than 64 (or equal to 32), then subblock mode and TPM are not valid and since they are not allowed. Furthermore, if MMVD mode is disabled as indicated by the SPS flag, then the regular flag should not be signaled and the regular Skip mode should be inferred to be true. In another example, for the Merge mode, if the CU size is smaller than 64 (or equal to 32), then subblock mode, CIIP mode and TPM are not valid since they are not allowed. Furthermore, if MMVD mode is disabled as indicated by the SPS flag, then the regular flag should not be signaled and regular Merge mode should be inferred to be true.

In another embodiment, if the CU size is larger than or equal to a threshold, then all modes are valid. However, if all modes except for the regular Merge/Skip mode are disabled as indicated by the SPS flag, the regular flag should not be signaled and the regular Merge/Skip mode should be inferred to be true. For example, for the Skip mode, if the CU size is larger than or equal to 64 and MMVD mode, subblock mode, TPM are disabled as indicated by the SPS flag, the regular flag should not be signaled and the regular Skip mode should be inferred to be true. In another example, for the Merge mode, if the CU size is larger than or equal to 64 and the MMVD mode, subblock mode, CIIP mode and TPM are disabled as indicated by the SPS flag, the regular flag should not be signaled and the regular Merge mode should be inferred to be true. In yet another example, if no other modes except for the regular Skip/Merge mode are valid, the regular flag should not be signaled and regular Skip/Merge mode should be inferred to be true.

In another embodiment, a fallback mode is needed when none of the modes in the Merge/Skip mode is available. A fallback mode can be the regular Merge mode with a predefined regular Merge index, or can be the MMVD mode with a predefined MMVD Merge index, MMVD distance index, or MMVD direction index. The fallback mode can be a subblock mode with a predefined subblock Merge index. The fallback mode can also be the CIIP mode with a predefined CIIP MPM (most probable mode) flag or CIIP MPM index. The fallback mode can also be the triangle mode with a predefined split direction and two indices. For example, when all modes including regular Merge mode, MMVD mode, subblock mode and CIIP mode are disabled as indicated by a signaled flag or being inferred, and the triangle mode is disabled as indicated in the SPS flag, then there is no available mode in this case and a regular Merge mode is set with Merge index as zero.

In another embodiment, a flag to indicate true or false of regular Merge mode, MMVD mode, subblock mode, CIIP mode, and triangle modes should not to be signaled and should be inferred to true when all the following modes are not available as indicated by the SPS flags, size constraints, slice type, or different modes such as Intra/Inter/IBC/Merge/Skip. For example, when the SPS flag for MMVD, Affine, SbTMVP, CIIP, and triangle modes are all disabled, the regular Merge mode flag should not to be signaled and should be set true according to one embodiment. For another example, when the SPS flag for the triangle mode is disabled, the CIIP mode flag should not to be signaled and should be set true according to another embodiment.

The foregoing methods disclosed above can be implemented in encoders and/or decoders. For example, the methods can be implemented in an Inter prediction module and/or Intra block copy prediction module of an encoder, and/or a Inter prediction module (and/or Intra block copy prediction module) of a decoder.

Figure 4:
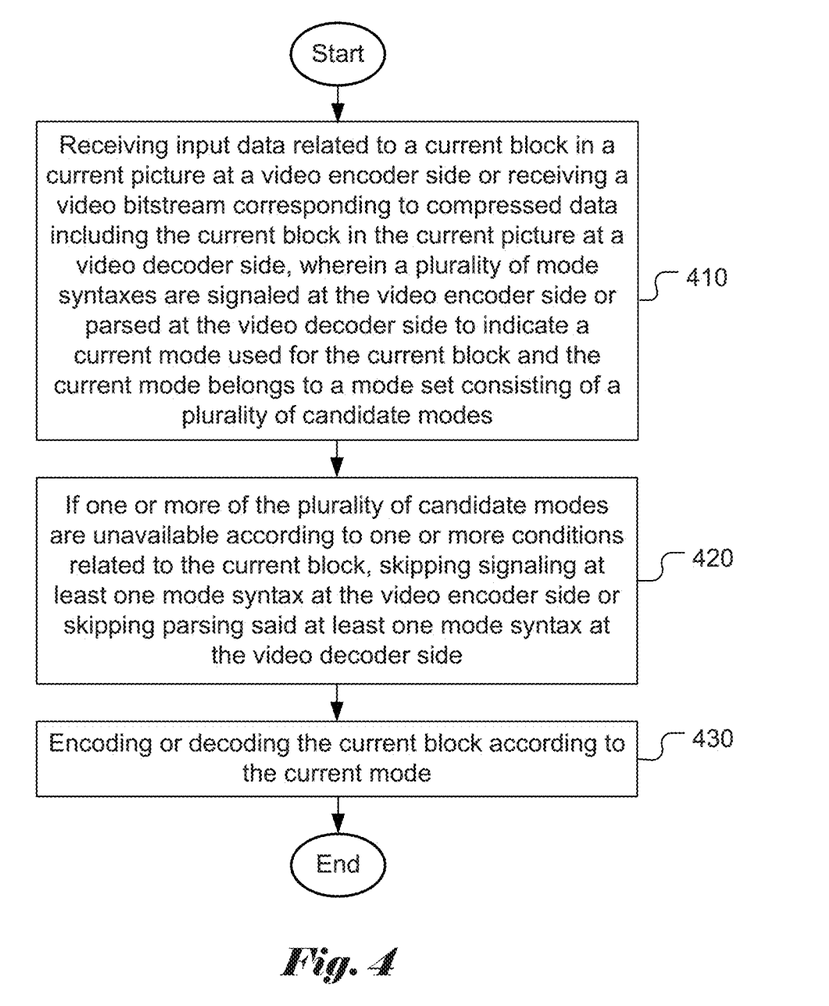
FIG. 4 illustrates a flowchart of an exemplary video coding using constrained mode signaling according to an embodiment of the present invention.

FIG. 9 illustrates a flowchart of an exemplary video coding using constrained mode signaling according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture are received at a video encoder side or a video bitstream corresponding to compressed data including the current block in the current picture is received at a video decoder side in step 410, wherein a plurality of mode syntaxes are signaled at the video encoder side or parsed at the video decoder side to indicate a current mode used for the current block and the current mode belongs to a mode set consisting of a plurality of candidate modes. In step 420, if one or more of the plurality of candidate modes are unavailable according to one or more conditions related to the current block, signaling at least one mode syntax is skipped at the video encoder side or parsing said at least one mode syntax is skipped at the video decoder side. In step 430, the current block is encoded or decoded according to the current mode.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding, the method comprising:
receiving a video bitstream including encoded data of a current block in a current picture;
parsing a first availability flag of a first Merge candidate mode and a second availability flag of a second Merge candidate mode signaled at a sequence level of the video bitstream, the first availability flag indicating whether the first Merge candidate mode is available for a sequence of pictures that includes the current picture, and the second availability flag indicating whether the second Merge candidate mode is available for the sequence of pictures that includes the current picture;
determining a merge mode for coding the current block, comprising, in a case that the first availability flag indicating that the first Merge candidate mode is available for the sequence of pictures:
determining whether one of one or more other Merge candidate modes is used as the merge mode for coding the current block according to respective one or more mode flags signaled at a block level for the current block;
after determining that the one or more other Merge candidate modes are not used as the merge mode for coding the current block, determining whether to parse a first mode flag of the first Merge candidate mode signaled at the block level for the current block based on the second availability flag of the second Merge candidate mode;

when the first mode flag is determined as to be parsed in response to the second availability flag of the second Merge candidate mode indicating that the second Merge candidate mode is available for the sequence of pictures, parsing the first mode flag from the video bitstream to determine whether the first Merge candidate mode or the second Merge candidate mode is used for coding the current block; and when the first mode flag is determined as not to be parsed in response to the second availability flag of the second Merge candidate mode indicating that the second Merge candidate mode is not available for the sequence of pictures, inferring whether the first Merge candidate mode is used for coding the current block; and decoding the encoded data of the current block based on the determined merge mode for coding the current block, wherein the one or more other Merge candidate modes correspond to one or more of a regular Merge mode, a Merge with motion vector difference mode, and a subblock mode, the first Merge candidate mode corresponds to a combined Inter and Intra prediction Merge mode, and the second Merge candidate mode corresponds to a partitioning prediction mode that splits the current block into two non-rectangular prediction units, each of the two non-rectangular prediction units being Inter-predicted using respective pieces of motion information.

2. The method of claim 1, wherein the second availability flag of the second Merge candidate mode signaled at the sequence level is signaled in a SPS (Sequence Parameter Set).

3. The method of claim 1, wherein, when the current block is a non-Skip block, a regular flag indicating on or off of the regular Merge mode for the current block is not signaled if a size of the current block is smaller than 64 or equal to 32 so that the subblock mode, the combined Inter and Intra prediction Merge mode, and the partitioning prediction mode are not valid and if the Merge with motion vector difference mode is disabled as indicated by an SPS flag.

4. The method of claim 1, wherein, when the current block is a Skip block, a regular flag indicating on or off of the regular Merge mode for the current block is not signaled if a size of the current block is smaller than 64 or equal to 32 so that the subblock mode, the combined Inter and Intra prediction Merge mode, and the partitioning prediction mode are not valid and if the Merge with motion vector difference mode is disabled as indicated by an SPS flag.

5. The method of claim 1, wherein, when the current block is a Skip block, a regular flag indicating on or off of a regular Skip mode for the current block is not signaled if a size of the current block is larger than or equal to 64 and if the Merge with motion vector difference mode, the subblock mode, and the partitioning prediction mode are disabled as indicated by an SPS flag.

6. The method of claim 1, wherein a regular flag indicating on or off of the regular Merge mode or a regular Skip mode for the current block is not signaled if the Merge with motion vector difference mode, an Affine mode, a subblock Temporal Motion Vector Prediction mode, the combined Inter and Intra prediction Merge mode, and the partitioning prediction mode are disabled as indicated by an SPS flag.

7. An apparatus of video decoding, the apparatus comprising one or more electronic circuits or processors arranged to:
- receive a video bitstream including encoded data of a current block in a current picture;
- parse a first availability flag of a first Merge candidate mode and a second availability flag of a second Merge candidate mode signaled at a sequence level of the video bitstream, the first availability flag indicating whether the first Merge candidate mode is available for a sequence of pictures that includes the current picture, and the second availability flag indicating whether the second Merge candidate mode is available for the sequence of pictures that includes the current picture;
- determine a merge mode for coding the current block, by performing operations comprising, in a case that the first availability flag indicating that the first Merge candidate mode is available for the sequence of pictures:
  - determination of whether one of one or more other Merge candidate modes is used as the merge mode for coding the current block according to respective one or more mode flags signaled at a block level for the current block;
  - after determining that the one or more other Merge candidate modes are not used as the merge mode for coding the current block, determination of whether to parse a first mode flag of the first Merge candidate mode signaled at the block level for the current block based on the second availability flag of the second Merge candidate mode;
  - when the first mode flag is determined as to be parsed in response to the second availability flag of the second Merge candidate mode indicating that the second Merge candidate mode is available for the sequence of pictures, parse of the first mode flag from the video bitstream to determine whether the first Merge candidate mode or the second Merge candidate mode is used for coding the current block; and
  - when the first mode flag is determined as not to be parsed in response to the second availability flag of the second Merge candidate mode indicating that the second Merge candidate mode is not available for the sequence of pictures, inference of whether the first Merge candidate mode is used for coding the current block; and
- decode the encoded data of the current block based on the determined merge mode for coding the current block, wherein
the one or more other Merge candidate modes correspond to one or more of a regular Merge mode, a Merge with motion vector difference mode, and a subblock mode,
the first Merge candidate mode corresponds to a combined Inter and Intra prediction Merge mode, and
the second Merge candidate mode corresponds to a partitioning prediction mode that splits the current block into two non-rectangular prediction units, each of the two non-rectangular prediction units being Inter-predicted using respective pieces of motion information.

8. A method of video encoding, the method comprising:
receiving input data related to a current block in a current picture, the current block is to be encoded using a first Merge candidate mode, and a first availability flag of the first Merge candidate mode to be signaled at a sequence level of a video bitstream being set to indicate that the first Merge candidate mode is available for a sequence of pictures that includes the current picture;
determining whether to incorporate a first mode flag of the first Merge candidate mode to be signaled at a block level for the current block based on a second availability flag of a second Merge candidate mode to be signaled at the sequence level, the second availability flag indicating whether the second Merge candidate mode is available for the sequence of pictures that includes the current picture, comprising:
  when the second availability flag of the second Merge candidate mode indicates that the second Merge candidate mode is available for the sequence of pictures, incorporating the first mode flag to be signaled at the block level into the video bitstream to indicate the first Merge candidate mode is used for coding the current block; and
  when the second availability flag of the second Merge candidate mode indicates that the second Merge candidate mode is not available for the sequence of pictures, not incorporating the first mode flag into the video bitstream, wherein whether the first Merge candidate mode is used for coding the current block is inferred;
setting one or more mode flags to be signaled at the block level of the video bitstream for the current block to indicate that respective one or more other Merge candidate modes are not used for coding the current block, wherein the first mode flag when being signaled is signaled after the one or more mode flags; and
generating encoded data of the current block by encoding the current block based on the first Merge candidate mode and incorporating the encoded data of the current block into the video bitstream,
wherein
the one or more other Merge candidate modes correspond to one or more of a regular Merge mode, a Merge with motion vector difference mode, and a subblock mode,
the first Merge candidate mode corresponds to a combined Inter and Intra prediction Merge mode, and
the second Merge candidate mode corresponds to a partitioning prediction mode that splits the current block into two non-rectangular prediction units, each of the two non-rectangular prediction units being Inter-predicted using respective pieces of motion information.

9. The apparatus of claim 7, wherein the second availability flag of the second Merge candidate mode signaled at the sequence level is signaled in a SPS (Sequence Parameter Set).

10. The method of claim 8, wherein the second availability flag of the second Merge candidate mode signaled at the sequence level is signaled in a SPS (Sequence Parameter Set).

* * * * *